(12) United States Patent
Kim et al.

(10) Patent No.: US 8,904,095 B2
(45) Date of Patent: Dec. 2, 2014

(54) DATA STORAGE DEVICE AND OPERATING METHOD THEREOF

(75) Inventors: Young Ho Kim, Icheon-si (KR); Kyeong Rho Kim, Icheon-si (KR); Jeong Soon Kwak, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 159 days.

(21) Appl. No.: 13/602,227

(22) Filed: Sep. 3, 2012

(65) Prior Publication Data

US 2013/0275657 A1    Oct. 17, 2013

(30) Foreign Application Priority Data

Apr. 13, 2012  (KR) .......................... 10-2012-0038472

(51) Int. Cl.
*G06F 12/00*  (2006.01)
*G06F 13/00*  (2006.01)

(52) U.S. Cl.
USPC ............ 711/103; 711/100; 711/154; 711/157

(58) Field of Classification Search
CPC ............ G06F 12/0238; G06F 12/0607; G06F 12/0851; G06F 3/0679
USPC .......................... 711/100, 103, 127, 154, 157
See application file for complete search history.

(56) References Cited

U.S. PATENT DOCUMENTS

| | | | | |
|---|---|---|---|---|
| 8,019,938 B2* | 9/2011 | Flynn et al. | .................... | 711/113 |
| 8,452,912 B2* | 5/2013 | Lee et al. | ....................... | 711/103 |
| 2008/0320214 A1* | 12/2008 | Ma et al. | ....................... | 711/103 |

FOREIGN PATENT DOCUMENTS

| | | |
|---|---|---|
| KR | 1020060130084 A | 12/2006 |
| KR | 1020100037860 A | 4/2010 |

* cited by examiner

*Primary Examiner* — Tuan Thai
(74) *Attorney, Agent, or Firm* — William Park & Associates Patent Ltd.

(57) ABSTRACT

An operating method of a data storage device including a plurality of nonvolatile memory devices includes the steps of: mapping physical addresses of the nonvolatile memory devices into logical addresses; reflecting environmental factors to remap a physical address into a logical address requested to be accessed; and performing an interleaving operation for the nonvolatile memory devices using the remapped physical address.

20 Claims, 11 Drawing Sheets

100

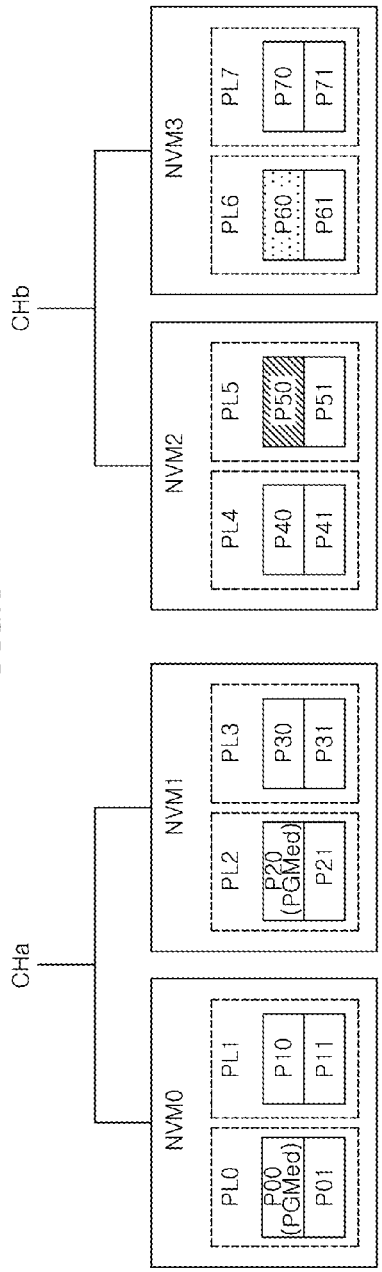

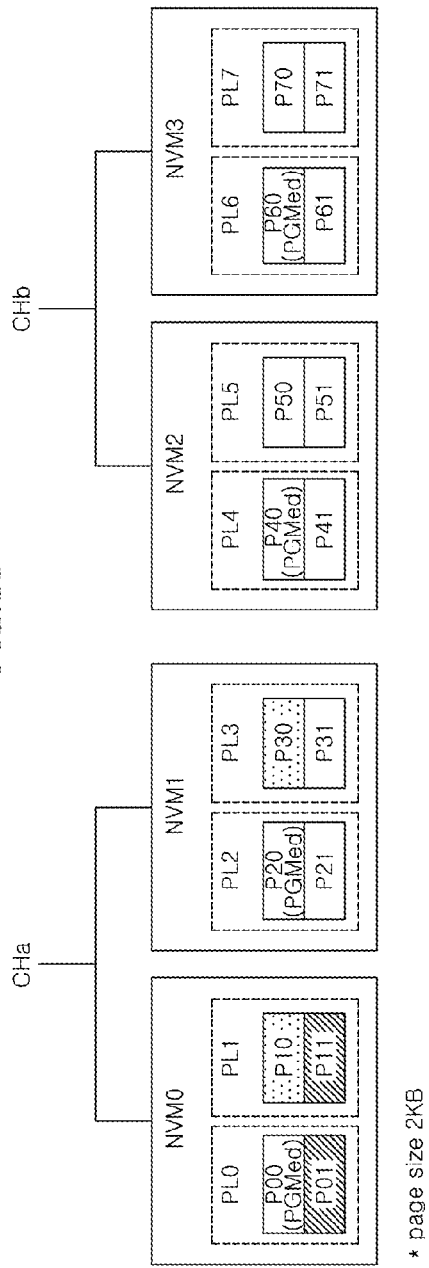

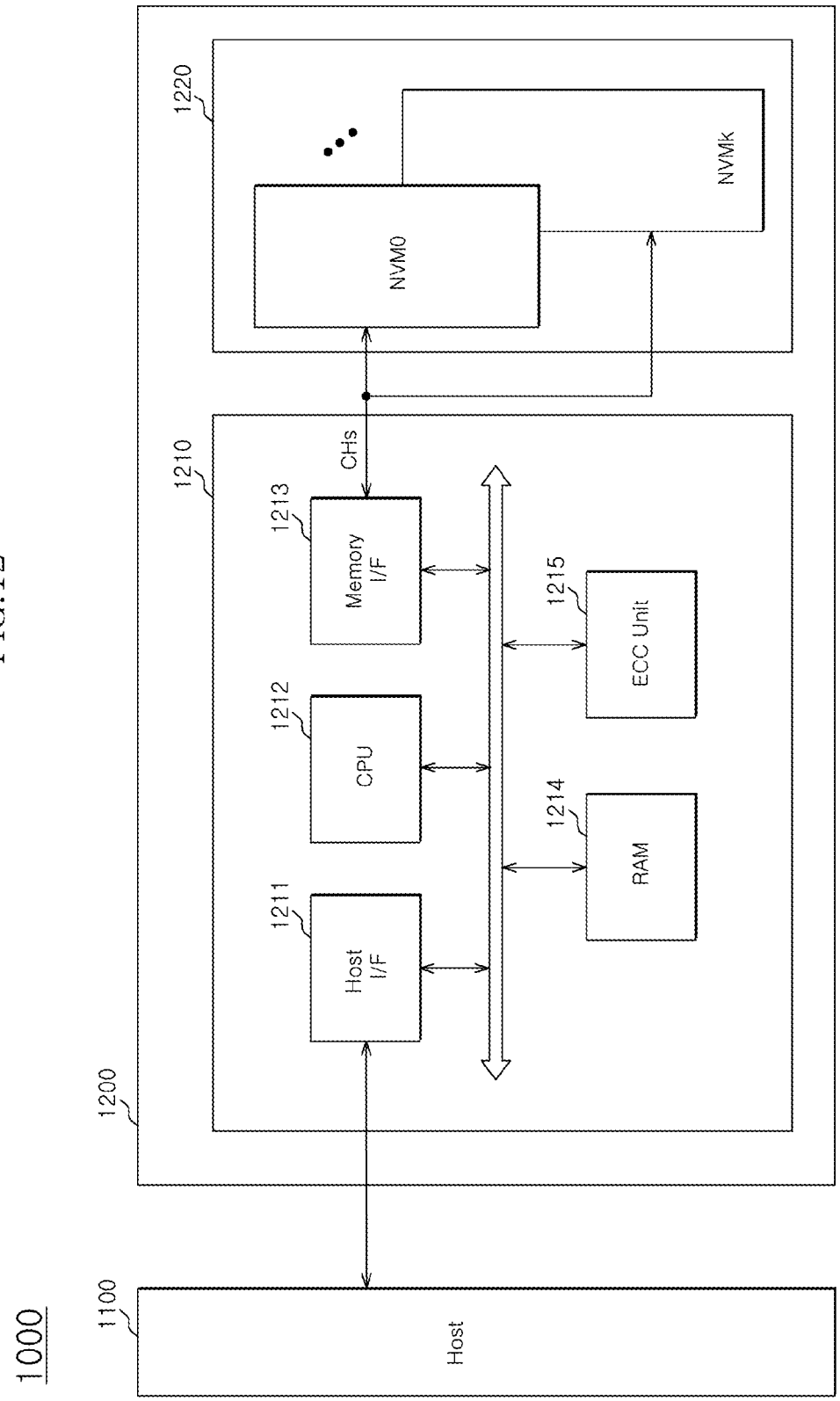

DATA STORAGE DEVICE AND OPERATING METHOD THEREOF

CROSS-REFERENCES TO RELATED APPLICATION

The present application claims priority under 35 U.S.C. §119(a) to Korean application number 10-2012-0038472, filed on Apr. 13, 2012, in the Korean Intellectual Property Office, which is incorporated herein by reference in its entirety.

BACKGROUND

1. Technical Field

The present invention generally relates to a data storage device, and more particularly, to a parallel processing method of a data storage device.

2. Related Art

Recently, the paradigm of the computing environment has changed into the ubiquitous computing environment in which computer systems are used anytime and anywhere. Accordingly, the use of portable electronic devices such as mobile phones, digital cameras, and notebook computers has rapidly increased. In general, such a portable electronic device uses a data storage device that in turn use memory devices. The data storage device is used as a main memory device or a secondary memory device of the portable electronic device.

The data storage device using memory devices does not include a mechanical driver. Thus, the data storage device has excellent stability and durability, exhibits a high information access speed, and has small consumption. The data storage device having such advantages may include a USB (Universal Serial Bus) memory device, a memory card having various interfaces, and a solid state drive (SSD) and the like.

As more and more portable electronic devices reproduce large files such as music files and video files, the data storage device is required to have a large storage capacity. The data storage device includes a plurality of memory devices to increase the storage capacity. In the data storage device including a plurality of memory devices, a high operating speed as well as a large storage capacity is one of the important characteristics of the data storage device.

The data storage device including a plurality of memory devices must effectively control the plurality of memory devices, in order to process data at high speeds. As a technique for effectively controlling a plurality of memory devices, a parallel processing method between the plurality of memory devices, for example, an interleaving method may be used. That is, the data storage device controls the plurality of memory devices in parallel to process data at a high rate, thereby minimizing the idle times of the respective memory devices.

Meanwhile, the data storage device maps a physical address of a memory device into a logical address requested from a host device having the data storage device mounted therein. In a general interleaving method, the physical address corresponding to the logical address provided from the host device is fixed. That is, address mapping is fixed. In the general interleaving method, an interleaving operation is performed based on the fixed address mapping. When the interleaving method is used based on the fixed address mapping, it is difficult to reflect environmental factors (for example, a request state of the host device, states of the memory devices and the like) which change depending on various cases.

SUMMARY

A data storage device using an enhanced parallel processing method and an operating method thereof are described herein.

In an embodiment, an operating method of a data storage device including a plurality of nonvolatile memory devices includes the steps of: mapping physical addresses of the nonvolatile memory devices into logical addresses; reflecting environmental factors to remap a physical address into a logical address that is requested to be accessed; and performing an interleaving operation for the nonvolatile memory devices using the remapped physical address.

In another embodiment, a data storage device includes: a plurality of nonvolatile memory devices; and a controller configured to control operations of the nonvolatile memory devices, wherein the controller maps physical addresses of the nonvolatile memory devices into logical address provided from a host device, remaps a physical address into a logical address requested to be accessed from the host device by reflecting environmental factors of the host device and the nonvolatile memory devices, and performs an interleaving operation for the nonvolatile memory devices using a remapped physical address.

BRIEF DESCRIPTION OF THE DRAWINGS

Features, aspects, and embodiments are described in conjunction with the attached drawings, in which:

FIGS. 8 and 9 are diagrams illustrating a dynamic interleaving method according to another embodiment;

FIGS. 10 and 11 are diagrams illustrating a dynamic interleaving method according to another embodiment;

FIG. 12 is a block diagram illustrating a data processing system according to another embodiment;

DETAILED DESCRIPTION

Hereinafter, a data storage device and an operating method thereof will be described below with reference to the accompanying drawings through various embodiments.

The drawings are not necessarily to scale and in some instances, proportions may have been exaggerated in order to clearly illustrate features of the embodiments. In this specification, specific terms have been used. The terms are used to describe the present invention, and are not used to qualify the sense or limit the scope of the present invention.

In this specification, 'and/or' represents that one or more of components arranged before and after 'and/or' is included. Furthermore, 'connected/coupled' represents that one component is directly coupled to another component or indirectly coupled through another component. In this specification, a singular form may include a plural form as long as it is not specifically mentioned in a sentence. Furthermore, 'include/comprise' or 'including/comprising' used in the specification represents that one or more components, steps, operations, and elements exists or are added.

Figure 1:
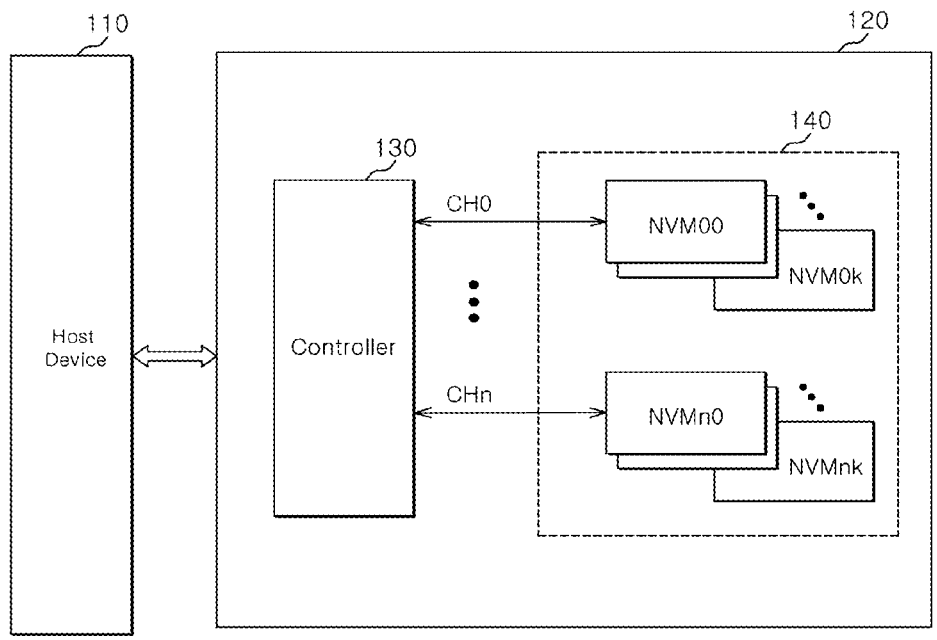
FIG. 1 is a block diagram of an example of a data processing system including a data storage device according to an embodiment.

FIG. 1 is a block diagram of a data processing system including a data storage device according to an embodiment. Referring to FIG. 1, the data processing system 100 may include a host device 110 and a data storage device 120.

The host device 110 may include portable electronic devices such as mobile phones and MP3 players or electronic devices such as desktop computers, game machines, TVs, beam projectors, and the like.

The data storage device 120 may be configured to operate in response to a request of the host device 110. The data storage device 120 may be configured to store data accessed by the host device 100. That is, the data storage device 120 may be used as a main memory device or secondary memory device of the host device 110. The data storage device 120 may include a controller 130 and a data storage medium 140. The controller 130 and the data storage medium 140 may be configured as a memory card connected to the host device 100 through various interfaces. Alternatively, the controller 130 and the data storage medium 140 may be configured as an SSD.

The controller 130 may be configured to control the data storage medium 140 in response to a request from the host device 110. For example, the controller 130 may be configured to provide data read from the data storage medium 140 to the host device 110. As another example, the controller 130 may be configured to store data provided from the host device 110 in the data storage medium 140. For these operations, the controller 130 controls read, program (or write), and erase operations of the data storage medium 140.

The data storage medium 140 may include a plurality of nonvolatile memory devices NVM00 to NVM0$k$ and NVMn0 to NVMnk. According to an embodiment, each of the nonvolatile memory devices NVM00 to NVM0$k$ and NVMn0 to NVMnk may be configured as a NAND flash memory device. However, each of the nonvolatile memory devices NVM00 to NVM0$k$ and NVMn0 to NVMnk may be configured as another kind of nonvolatile memory device instead of a NAND flash memory device. For example, each of the nonvolatile memory devices NVM00 to NVM0$k$ and NVMn0 to NVMnk may be configured as any one of various memory devices such as NOR flash memory, ferroelectric RAM (FRAM) using a ferroelectric capacitor, magnetic RAM (MRAM) using a tunneling magneto-resistive (TMR) layer, and phase change memory (PRAM) using chalcogenide alloys.

The flash memory devices NVM00 to NVM0$k$ and NVMn0 to NVMnk may be connected to the controller 130 through channels CH0 to CHn. The controller 130 may operate the channels CH0 to CHn in parallel. For example, the controller 130 may control an interleaving operation between the channels CH0 to CHn. Furthermore, the controller 130 may operate the flash memory devices NVM00 to NVM0$k$ or NVMn0 to NVMnk connected to one channel (that is, CH0 or CHn) in parallel. That is, the controller 130 may control an interleaving operation between the flash memory devices NVM00 to NVM0$k$ or NVMn0 to NVMnk.

Meanwhile, although not illustrated, each of the flash memory devices NVM00 to NVM0$k$ and NVMn0 to NVMnk may have a multi-plane structure. Here, the plane means a unit for dividing memory blocks sharing a page buffer. In this case, the controller 130 may operate planes included in one flash memory device (for example, two planes) in parallel. For example, the controller 130 may control an interleaving operation between the planes.

In other words, the storage area of the data storage device 120 may include the channels CH0 to CHn, the flash memory devices NVM00 to NVM0$k$ and NVMn0 to NVMnk connected to the respective channels CH0 to CHn, and a plurality of pages divided by planes (not illustrated) included in each of the flash memory devices NVM00 to NVM0$k$ and NVMn0 to NVMnk. In the data storage device 120 including the plurality of pages, the controller 130 needs to access effectively the plurality of pages, in order to process data at a high speed. For this operation, the controller 130 may process the plurality of pages in parallel (hereafter, referred to as "interleaving").

Figure 2:
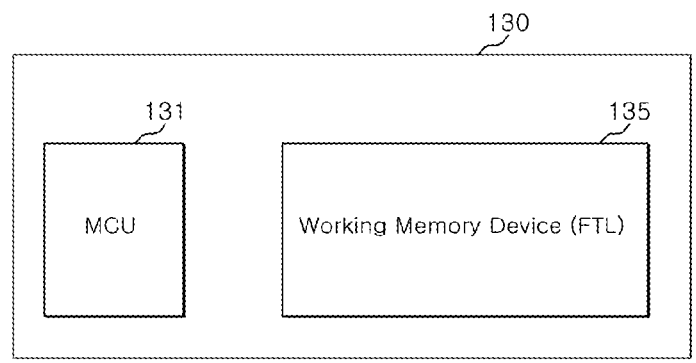
FIG. 2 is a block diagram illustrating an example of a controller of the data storage device of FIG. 1.

FIG. 2 is a block diagram illustrating the controller of the data storage device of FIG. 1. Referring to FIG. 2, the controller 130 may include a micro controller unit (MCU) 131 and a working memory device 135. However, components of the controller 130 may not be limited to the above-described components. For example, the controller 130 may further include a host interface, a memory interface, an error correction code (ECC) unit and the like.

The MCU 131 may be configured to control overall operations of the controller 130. The MCU 131 may be configured to drive firmware for controlling the overall operations of the controller 130. The firmware may be loaded into the working memory device 135 and then driven. The MCU 131 may provide a command, an address, a control signal, and data for controlling the data storage medium 140 according to a request of the host device 110.

The working memory device 135 may be configured to store the firmware and data for controlling the controller 130. The working memory device 135 may include one or more of cache, DRAM, SRAM, ROM, NOR flash memory device and the like. According to an embodiment, the working memory device 135 stores a flash translation layer (FTL). When a request is made from the host device 110, the FTL may be driven by the MCU 131.

Figure 3:
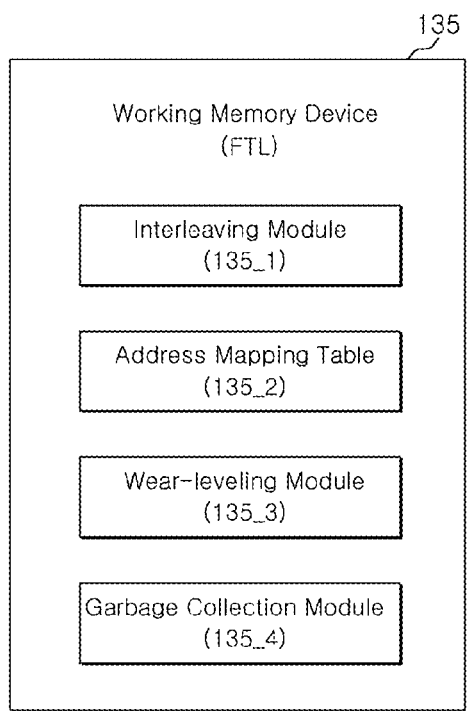
FIG. 3 is a diagram illustrating firmware driven in a working memory device of FIG. 2.

FIG. 3 is a diagram explaining the firmware driven in the working memory device of FIG. 2.

Each of the flash memory devices forming the data storage medium 140 may perform a read or program operation on a page-wise basis, due to structural characteristics thereof. Furthermore, the flash memory device may perform an erase operation on a block-wise basis, due to the structure characteristics thereof. Here, the page means an operating unit including a plurality of memory cells, and the block means an operating unit including a plurality of pages. Furthermore, the flash memory device may not perform an over-write operation. That is, a flash memory cell having data stored therein may be erased to store new data.

Because of these characteristics of the flash memory device, the data storage device 120 including the flash memory devices serving as the data storage medium 140 may require additional software called disk emulation software to guarantee the compatibility with the host device 100. That is, the data storage device 120 including the flash memory devices may operate firmware such as the FTL to guarantee the compatibility with the host device 100.

The FTL may manage read, program, and erase operations of the flash memory devices such that the data storage device 120 may be operated in response to an access required from a file system of the host device 100 (for example, read/write operation). Accordingly, the file system of the host device 110 may recognize the data storage device 120 including the flash memory devices as a general data storage device.

Referring to FIG. 3, the FTL may include a plurality of modules and management data. For example, the FTL may include an interleaving module 135_1, an address mapping table 135_2, a wear-leveling module 135_3, and a garbage collection module 135_4. However, the configuration of the FTL may not be limited to the above-described modules. For example, the FTL may further include a bad block management module for managing a block containing a failed memory cell and a sudden power-off management module for preparing for unexpected power-off.

The interleaving module 135_1 may perform an interleaving operation (or deinterleaving operation) between the flash memory devices forming the data storage medium 140. The interleaving module 135_1 may manage data to be programmed in the data storage medium 140 according to the interleaving method. For example, the interleaving module 135_1 may divide data to be stored in the data storage medium 140 into arbitrary sizes, mix the divided data, and reconstruct the mixed data into data to be actually programmed. Furthermore, the interleaving module 135_1 may program the reconstructed data into the flash memory devices of the data storage medium 140 in parallel. Furthermore, the interleaving module 135_1 may manage data stored in the data storage medium 140 such that the data may be read out according to the deinterleaving method. The deinterleaving method may be performed in the opposite order of the interleaving method.

In an embodiment, the interleaving module 135_1 may perform a dynamic interleaving method. Here, the dynamic interleaving method may indicate an interleaving method which is performed by reflecting environmental factors. The dynamic interleaving method will be described with reference to FIGS. 4 to 11.

When the host device 110 accesses the data storage device 120, for example, and when a read or write operation is requested, the host device 110 may provide a logical address to the data storage device 120. The FTL may translate the provided logical address into a physical address of the data storage medium 140, and may perform the requested operation by referring to the translated physical address. The FTL may manage address translation data, that is, the address mapping table 135_2, for the address translation operation.

The wear-leveling module 135_3 may manage the wear levels of blocks of the flash memory devices forming the data storage medium 140. The memory cells of the flash memory devices may be aged by program and erase operations. The aged memory cells, that is, worn memory cells may cause defects, for example, a physical defect. The wear-leveling module 135_3 may level off the erase-write cycles of the respective blocks, in order to prevent a specific block of the flash memory devices from being worn more rapidly than the other blocks.

The garbage collection module 135_4 may manage blocks in which fragmented data may be stored. The flash memory devices forming the data storage medium 140 may not be able to perform an over-write operation, and the program unit thereof may be larger than the erase unit. For this reason, the flash memory devices may require an operation of collecting effective data distributed at physically different positions into the same address area using an arbitrary empty space, when the storage space thereof approaches a predetermined limit. The garbage collection module 135_4 may perform a plurality of write operations and a plurality of erase operations to collect fragmented data into the same address area.

Figures 4, 5:
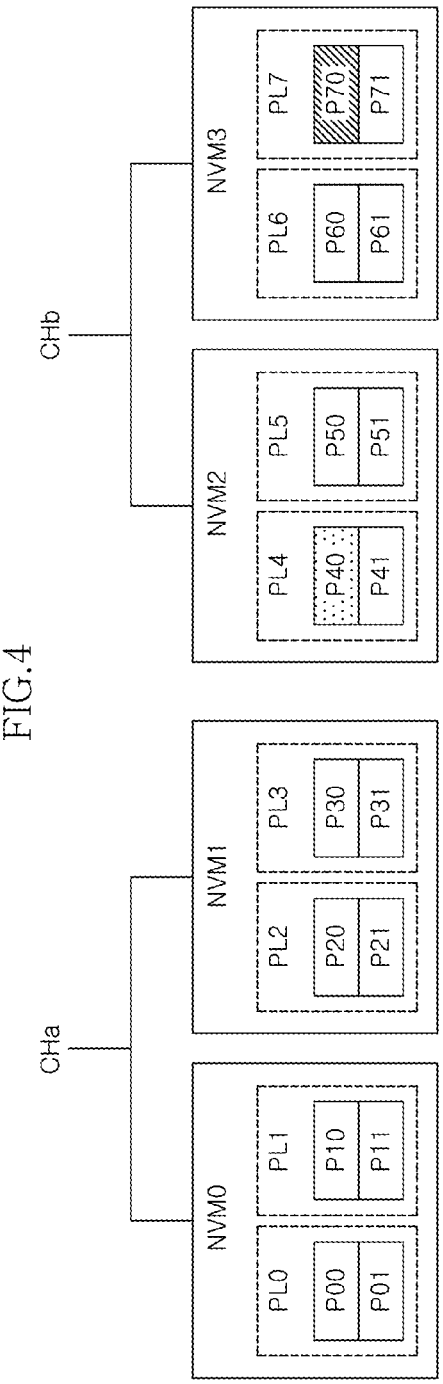
FIGS. 4 and 5 are diagrams illustrating the concept of a dynamic interleaving method according to an embodiment.

FIGS. 4 and 5 are diagrams illustrating the concept of the dynamic interleaving method according to an embodiment.

FIG. 4 illustrates flash memory devices forming the data storage medium 140 of FIG. 1. For convenience of description, suppose that the data storage medium 140 may include four flash memory devices NVM0, NVM1, NVM2, and NVM3. Furthermore, suppose that the flash memory devices NVM0 to NVM3 may be connected to the controller 130 through a channel CHa, and the flash memory devices NVM2 and NVM3 may be connected to the controller 130 through a channel CHb. Furthermore, suppose that each of the flash memory devices NVM0 to NVM3 may include two planes (i.e., PL0 to PL7), and each of the planes may include two pages (i.e., P00, P01, P10, P11, P20, P21, P30, P31, P40, P41, P50, P51, P60, P61, P70, and P71). For example, the flash memory device NVM0 may include two planes PL0 and PL1, and the respective planes PL0 and PL1 may include two pages P00 and P01, and P10 and P11, respectively.

FIG. 5 illustrates a mapping table which may be changed when the dynamic interleaving method is used. According to the supposition of FIG. 4, the data storage medium 140 may include a total of 16 pages. The 16 pages may be discriminated by page addresses P00 to P71, that is, physical addresses. The physical addresses P00 to P71 may be mapped into logical addresses L (i.e., L0, L1, L2, L3, . . . ) provided from the host device 100.

Referring to the address mapping table before the dynamic interleaving method is performed, the initial address mapping may be set in consideration of the number of flash memory devices per channel, the number of planes per flash memory device, and the number of pages per plane such that the idle times of the respective flash memory devices NVM0 to NVM3 are minimized through an interleaving operation. For example, a logical address L0 may be mapped into a physical address P00, a logical address L1 may be mapped into a physical address P20, a logical address L2 may be mapped into a physical address P40, and a logical address L3 may be mapped into a physical address P60 and so forth. In this way, the other logical addresses are mapped into the other physical addresses, respectively.

When the dynamic interleaving method according to an embodiment is performed, environmental factors may be reflected to change the address mapping. That is, when the dynamic interleaving method is performed, the environmental factors may be reflected to change a physical address mapped into a logical address. For example, referring to the changed mapping table, the physical address mapped into the logical address L2 may be changed.

The environmental factors reflected in the dynamic interleaving method may include physical factors and logical factors. The physical factors may include the numbers of channels and flash memory devices, the operating states of the channels and the flash memory devices, the size of physical pages, the positions of physical pages in which data may be programmed (or the positions of programmable physical pages), and operation characteristics of the flash memory devices. The logical factors may include the size of data requested currently and the size of data expected to be requested in the future. According to the dynamic interleaving method, the address mapping may be changed by considering the logical factors based on the physical factors. This means that an interleaving operation may not be performed statically, but may be performed dynamically. The dynamic interleaving method will be described with reference to FIGS. 6 to 11 assuming certain conditions.

Figure 6:
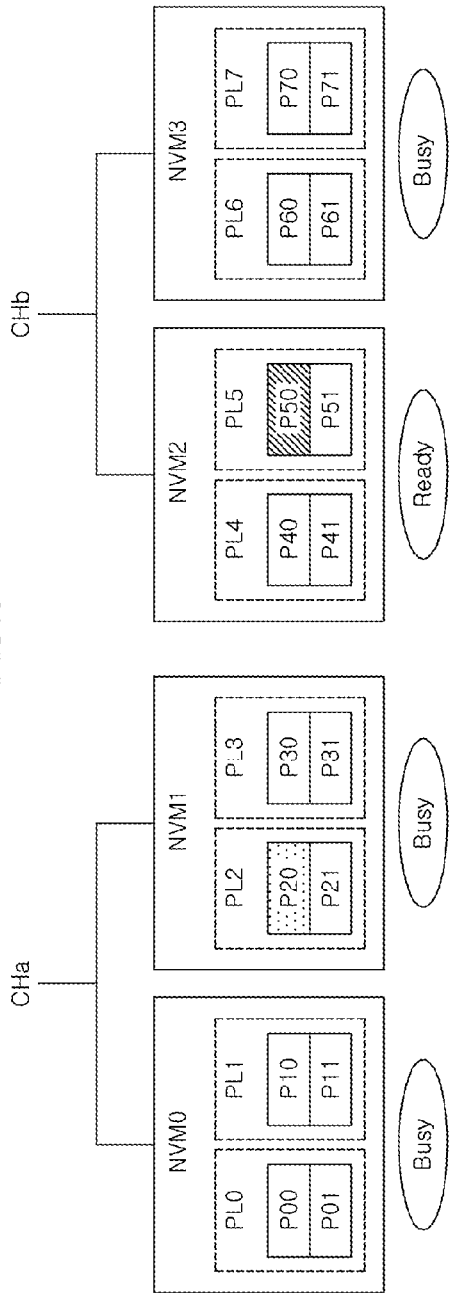
FIGS. 6 and 7 are diagrams illustrating the dynamic interleaving method according to an embodiment.
Figure 7:
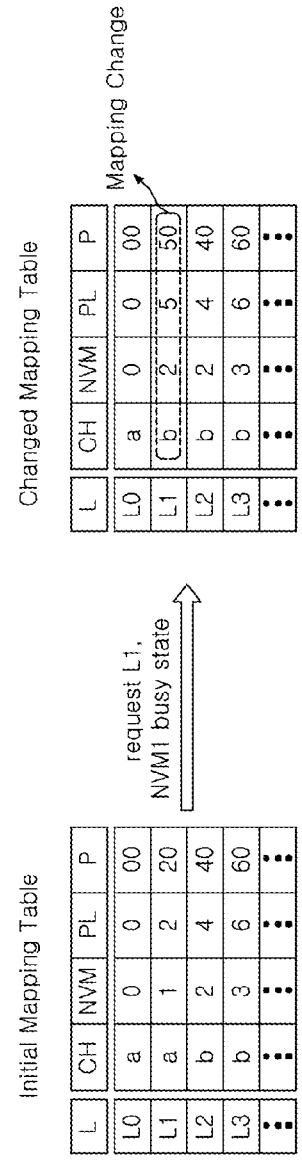

FIGS. 6 and 7 are diagrams illustrating the dynamic interleaving method according to an embodiment. Referring to FIGS. 6 and 7, the dynamic interleaving method reflecting the operating states (for example, ready state or busy state) of the channels and the flash memory devices will be described.

In FIGS. 6 and 7, suppose that the data storage medium 140 may include four flash memory devices NVM0 to NVM3 connected to channels CHa and CHb, respectively, for convenience of description. Furthermore, suppose that each of the flash memory devices NVM0 to NVM3 may include two planes (i.e. PL0 to PL7), and each of the planes may include two pages (i.e., P00 to P71). Meanwhile, suppose that the flash memory devices NVM0, NVM1, and NVM3 are in a busy state, and the flash memory device NVM2 is in a ready state.

Referring to FIG. 7, the initial address mapping before the dynamic interleaving method is performed may be set in consideration of the number of flash memory devices per channel, the number of planes per flash memory device, and the number of pages per plane such that the idle times of the flash memory devices NVM0 to NVM3 may be minimized through an interleaving operation. For example, a logical address L0 may be mapped into a physical address P00, a logical address L1 may be mapped into a physical address P20, a logical address L2 may be mapped into a physical address P40, and a logical address L3 may be mapped into a physical address P60 and so forth. In this way, the other local addresses may be mapped into the other physical addresses, respectively.

In such an environment, when an operation of programming data into the physical address P20 corresponding to the logical address L1 is requested from the host device 110, that is, when an operation of programming data into the physical address P20 of the flash memory device NVM1 in a busy state is requested, the dynamic interleaving method may be performed by reflecting the operating state of the flash memory device NVM1. This may be described as follows.

Although data provided from the host device 110 may be programmed into the physical address P20 corresponding to the logical address L1, the flash memory device NVM1 to which the physical address P20 is allocated may be currently in a busy state. That is, the program request from the host device 110 may not be performed immediately. Therefore, a dynamic interleaving operation reflecting the operating states of the channels and the flash memory devices NVM0 to NMV3 may be performed. As a result, the logical address L1 may be remapped into a physical address of the flash memory device NVM1 in a ready state where a program operation can be performed immediately. For example, the logical address L1 may be remapped into the physical address P50 from the physical address P20. Furthermore, the data requested to be programmed into the logical address L1 may be programmed into the physical address P50.

Meanwhile, although the logical address L1 may be remapped into the physical address 50 by the dynamic interleaving method, the logical address L1 may be remapped into another physical address depending on the state of the flash memory device NVM2 in the ready state. For example, the logical address L1 may be remapped into the positions of pages where data are not programmed.

FIGS. 8 and 9 are diagrams illustrating a dynamic interleaving method according to another embodiment. Referring to FIGS. 8 and 9, a dynamic interleaving method reflecting the size of data requested based on the size of a physical page and operation characteristics of flash memory devices will be described.

In FIGS. 8 and 9, suppose that the data storage medium 140 may include four flash memory devices NVM0 to NVM3 connected to channels CHa and CHb, for convenience of description. Furthermore, suppose that each of the flash memory devices NVM0 to NVM3 may include two planes (i.e., PL0 to PL7), and each of the planes may include two pages (i.e., P00 to P71). Meanwhile, suppose that the page size of the flash memory devices NVM0 to NVM3 may be 2 KB. Furthermore, suppose that pages corresponding to physical addresses P00 and P20 were previously programmed (i.e., PGMed). Referring to FIG. 9, the initial address mapping before the dynamic interleaving method is performed may be set in consideration of the number of flash memory devices per channel, the number of planes per flash memory device, and the number of pages per plane such that the idle times of the respective flash memory devices NVM0 to NVM3 may be minimized through an interleaving operation. For example, a logical address L0 may be mapped into a physical address P00, a logical address L1 may be mapped into a physical address P20, a logical address L2 may be mapped into a physical address P40, and a logical address L3 may be mapped into a physical address P60. In this way, the other local addresses may be mapped into the other physical addresses, respectively.

In such an environment, when an operation of programming data into the physical addresses P40 and P60 corresponding to the sequential logical addresses L2 and L3 is requested from the host device 110, the dynamic interleaving method reflecting the size of data requested based on the size of the physical pages and the operation characteristics of the flash memory devices may be performed. This may be described as follows.

The data which may be sequentially provided from the host device 110 should be programmed into the physical address P40 corresponding to the logical address L2 and the physical address P60 corresponding to the logical address L3. However, when the size of the sequentially-provided data is larger than a page corresponding to the program unit and smaller than multi-pages which may be operated in parallel by a multi-plane operation, it is more effective to program the provided data into one flash memory device according to the multi-plane method. Here, the multi-pages may include two or more pages which may be operated in parallel by the multi-plane method.

Therefore, the dynamic interleaving method reflecting the size of data requested based on the size of the physical pages and the operation characteristics of the flash memory devices may be performed. As a result, the logical address L3 may be remapped into a physical address of the flash memory device NVM2. For example, the logical address L3 may be remapped into the physical address P50 from the physical address P60. Furthermore, the data (2 KB) requested to be programmed into the logical address L2 and the data (2 KB) requested to be programmed into the logical address L3 may be programmed into pages corresponding to the physical addresses P40 and P50 according to the multi-plane method.

Meanwhile, although the logical address L3 may be remapped into the physical address P50 by the dynamic interleaving method, the logical addresses L2 and L3 may be remapped into other physical addresses depending on the positions of physical pages where the data of the flash memory devices NVM0 to NVM3 are programmed (or the positions of programmable physical pages). For example, the logical addresses L2 and L3 may be remapped into other physical addresses excluding the physical addresses P10 and P30 which may not be able to be programmed by the multi-plane method because of the physical addresses P00 and P20 where data may be programmed.

FIGS. 10 and 11 are diagrams illustrating a dynamic interleaving method according to another embodiment. Referring to FIGS. 10 and 11, a dynamic interleaving method reflecting the positions of physical pages where data may be programmed (or the positions of programmable physical pages) and the size of data to be subsequently requested may be described as follows.

Referring to FIGS. 10 and 11, suppose that the data storage medium 140 may include four flash memory devices NVM0 to NVM3 connected to channels CHa and CHb, for convenience of description. Furthermore, suppose that each of the flash memory devices NVM0 to NVM3 may include two planes (i.e., PL0 to PL7), and each of the planes may include two pages (i.e., P00 to P71). Meanwhile, suppose that the page size of the flash memory devices NVM0 to NVM3 may be 2 KB. Furthermore, suppose that pages corresponding to physical addresses P00, P20, P40, and P60 were previously programmed (i.e., PGMed).

Referring to FIG. 11, the initial address mapping before the dynamic interleaving method is performed may be set in consideration of the number of flash memory devices per channel, the number of planes per flash memory device, and the number of pages per plane such that the idle times of the flash memory devices NVM0 to NVM3 may be minimized through an interleaving operation. For example, a logical address L0 may be mapped into a physical address P00, a logical address L1 may be mapped into a physical address P20, a logical address L2 may be mapped into a physical address P40, a logical address L3 may be mapped into a physical address P60, a logical address L4 may be mapped into a physical address P10, and a logical address L5 may be mapped into a physical address P30. In this way, the other local addresses may be mapped into the other physical addresses, respectively.

In such an environment, when an operation of programming data into the physical addresses P10 and P30 corresponding to the logical addresses L4 and L5 is requested from the host device 110, and it may be predicated that the size of data (2 KB) expected to be requested next will be equal to the size of the physical page (2 KB), the dynamic interleaving method may be performed. At this time, the positions of physical pages where data may be programmed (or the positions of programmable physical pages) and the size of data to be subsequently requested may be reflected into the dynamic interleaving method. This may be described as follows.

The data which may be sequentially provided from the host device 110 may be programmed into the physical address P10 corresponding to the logical address L4 and the physical address P30 corresponding to the logical address L5. However, when the size of the sequentially-provided data is larger than a page corresponding to the program unit and smaller than multi-pages which may be operated in parallel by a multi-plane operation, it may be more effective to program the provided data into one flash memory device according to the multi-plane method. Furthermore, when it is predicted that the size of data to be requested next will be equal to the size of one physical page, it may be more effective to program the data to be requested next into a physical page which may not be able to be programmed by the multi-plane method.

Therefore, the dynamic interleaving method reflecting the positions of the physical pages where data are programmed (or the position of a programmable physical page) and the size of the data to be subsequently requested may be performed.

As a result, the logical address L4 may be remapped into the physical address P01 of the flash memory device NVM0, and the logical address L5 may be remapped into the physical address P11 of the flash memory device NVM0. Furthermore, the data (2 KB) requested to be programmed into the logical address L4 and the data (2 KB) requested to be programmed into the logical address L5 may be programmed into pages corresponding to the physical addresses P01 and P11 according to the multi-plane method. Meanwhile, the logical address corresponding to the data to be subsequently requested may be remapped into any one of the physical addresses P10, P30, P50, and P70. Furthermore, the data to be subsequently requested may be programmed into a page corresponding to the physical address.

Meanwhile, although the logical addresses L4 and L5 may be remapped into the physical addresses P01 and P11 by the dynamic interleaving method, the logical addresses L4 and L5 may be remapped into other physical addresses depending on the positions of physical pages where the data of the flash memory devices NVM0 to NVM3 are programmed (or the positions of programmable physical pages). For example, the logical addresses L4 and L5 may be remapped into other physical address which may be programmed by the multi-plane method.

According to the embodiments of the present invention, environmental factors may be reflected to change a physical address mapped into a logical address. Furthermore, the dynamic interleaving operation may be performed by referring to the changed mapping table. Here, the environmental factors may include the numbers of channels and flash memory devices, the operating states of the channels and the flash memory devices, the size of physical pages, the positions of physical pages where data are programmed (or the positions of programmable physical pages), the operation characteristics of the flash memory devices, the size of requested data, and the size of data expected to be requested in the future. According to the dynamic interleaving method, the interleaving operation may be effectively performed.

FIG. 12 is a block diagram illustrating a data processing system according to another embodiment. Referring to FIG. 12, the data processing system 1000 may include a host device 1100 and a data storage device 1200. The data storage device 1200 may include a controller 1210 and a data storage medium 1220. The data storage device 1200 may be connected to the host device 1100 such as a desktop computer, a notebook computer, a digital camera, a mobile phone, an MP3 player, or a game machine. The data storage device 1200 may also be called a memory system, etc.

The data storage device 1200 may perform the dynamic interleaving method according to the embodiments. Therefore, the data processing speed of the data storage device 1200 may be enhanced.

The controller 1210 may be connected to the host device 1100 and the data storage medium 1220. The controller 1210 may be configured to access the data storage medium 1220 in response to a request from the host device 1100. For example, the controller 1210 may be configured to control a read, program, or erase operation of the data storage medium 1220. The controller 1210 may be configured to drive firmware for controlling the data storage medium 1220.

The controller 1210 may include well-known components such as a host interface 1211 (i.e., Host I/F), a CPU 1212, a memory interface 1213 (i.e., Memory I/F), a RAM 1214, and an ECC unit 1215.

The CPU 1212 may be configured to control overall operations of the controller 1210 in response to a request of the host device 1100. The RAM 1214 may be used as a working memory of the CPU 1212. The RAM 1214 may temporarily store data read from the data storage medium 1220 or data provided from the host device 1100.

The host interface 1211 may be configured to interface the host device 1100 and the controller 1210. For example, the host interface 1211 may be configured to communicate with the host device 1100 through one of a USB (Universal Serial Bus) protocol, a MMC (Multimedia Card) protocol, a PCI (Peripheral Component Interconnection) protocol, a PCI-E (PCI-Express) protocol, a PATA (Parallel Advanced Technology Attachment) protocol, a SATA (Serial ATA) protocol, an SCSI (Small Computer System Interface) protocol, and an IDE (Integrated Drive Electronics) protocol, etc.

The memory interface 1213 may be configured to interface the controller 1210 and the data storage medium 1220. The memory interface 1213 may be configured to provide a command and an address to the data storage medium 1220. Furthermore, the memory interface 1213 may be configured to exchange data with the data storage medium 1220.

The ECC unit 1215 may be configured to detect an error of the data read from the data storage medium 1220. Furthermore, the ECC unit 1215 may be configured to correct the detected error, when the detected error falls within a correction range. Meanwhile, the ECC unit 1215 may be provided inside or outside the controller 1210 depending on the memory system 1000.

The controller 1210 and the data storage medium 1220 may be configured as a solid state drive (SSD).

As another example, the controller 1210 and the data storage medium 1220 may be integrated into one semiconductor device to form a memory card. For example, the controller 1210 and the data storage medium 1220 may be integrated into one semiconductor device to form a PCMCIA (personal computer memory card international association) card, a CF (compact flash) card, a smart media card, a memory stick, a multi-media card (MMC, RS-MMC, or MMC-micro), an SD (secure digital) card (SD, Mini-SD, or Micro-SD), or a UFS (universal flash storage) card.

As another example, the controller 1210 or the data storage medium 1220 may be mounted as various types of packages. For example, the controller 1210 or the data storage medium 1220 may be packaged and mounted according to various methods such as POP (package on package), ball grid arrays (BGAs), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat package (MQFP), thin quad flat package (TQFP), small outline IC (SOIC), shrink small outline package (SSOP), thin small outline package (TSOP), thin quad flat package (TQFP), system in package (SIP), multi chip package (MCP), wafer-level fabricated package (WFP), and wafer-level processed stack package (WSP).

Figure 13:
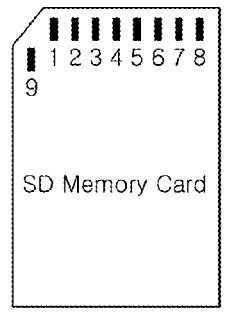
FIG. 13 illustrates a memory card according to an embodiment.

FIG. 13 illustrates an example of a memory card including the memory device according to an embodiment. FIG. 13 illustrates an example of an exterior of an SD (secure digital) card among memory cards.

Referring to FIG. 13, the SD card may include one command pin (for example, second pin), one clock pin (for example, fifth pin), four data pins (for example, first, seventh, eighth, and ninth pins), and three power supply pins (for example, third, fourth, and sixth pins).

Through the command pin (second pin), a command and a response signal may be transferred. In general, the command may be transmitted to the SD card from the host device, and the response signal may be transmitted to the host device from the SD card.

The data pins (first, seventh, eighth, and ninth pins) may be divided into receive (Rx) pins for receiving data transmitted from the host device and transmit (Tx) pins for transmitting data to the host device. The Rx pins and the Tx pins, respectively, form a pair to transmit differential signals.

The SD card may perform the dynamic interleaving method according to the embodiments. Therefore, the data processing speed of the SD card may be enhanced.

Figure 14:
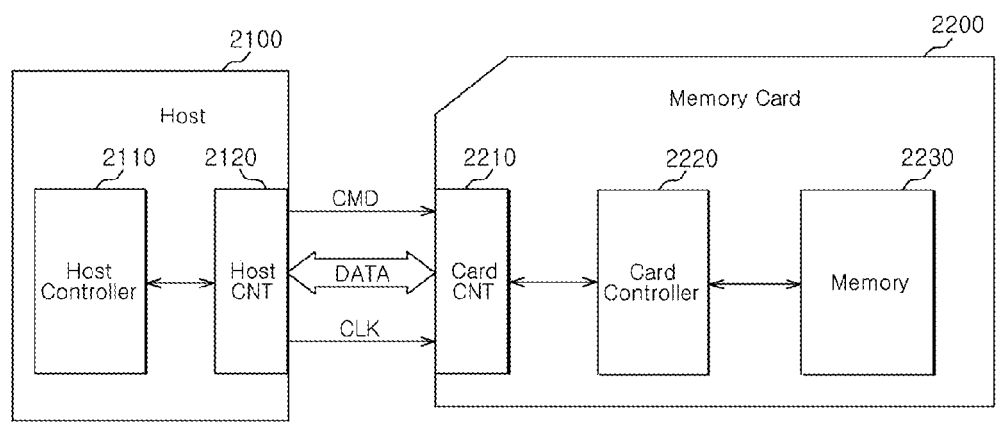
FIG. 14 is a block diagram illustrating the internal configuration of the memory card illustrated in FIG. 13 and the connection relation between the memory card and a host device.

FIG. 14 is a block diagram illustrating the internal configuration of the memory card illustrated in FIG. 13 and the connection relation between the memory card and a host device. Referring to FIG. 14, the data processing system 2000 may include a host device 2100 and a memory card 2200. The host device 2100 may include a host controller 2110 and a host connection unit 2120 (i.e., Host CNT). The memory card 2200 may include a card connection unit 2210 (i.e., Card CNT), a card controller 2220, and a memory device 2230.

The host connection unit 2120 and the card connection unit 2210 may include a plurality of pins. The pins may include a command pin, a clock pin, a data pin, and a power supply pin. The number of pins may differ depending on the type of the memory card 2200.

The host device 2100 may store data in the memory card 2200 or may read data stored in the memory card 2200.

The host controller 2110 may transmit a write command CMD, a clock signal CLK generated from a clock generator (not illustrated) inside the host device 2100, and data DATA to the memory card 2200 through the host connection unit 2120. The card controller 2220 may operate in response to the write command received through the card connection unit 2210. The card controller 2220 may store the received data DATA in the memory device 2230, using a clock signal generated from a clock generator (not illustrated) inside the card controller 2220, according to the received clock signal CLK.

The host controller 2110 may transmit a read command CMD and the clock signal CLK generated from the clock generator inside the host device 2100 to the memory card 2200 through the host connection unit 2120. The card controller 2220 may operate in response to the read command received through the card connection unit 2210. The card controller 2220 may read data from the memory device 2230 using the clock signal generated from the clock generator inside the card controller 2220, according to the received clock signal CLK, and may transmit the read data to the host controller 2110.

Figure 15:
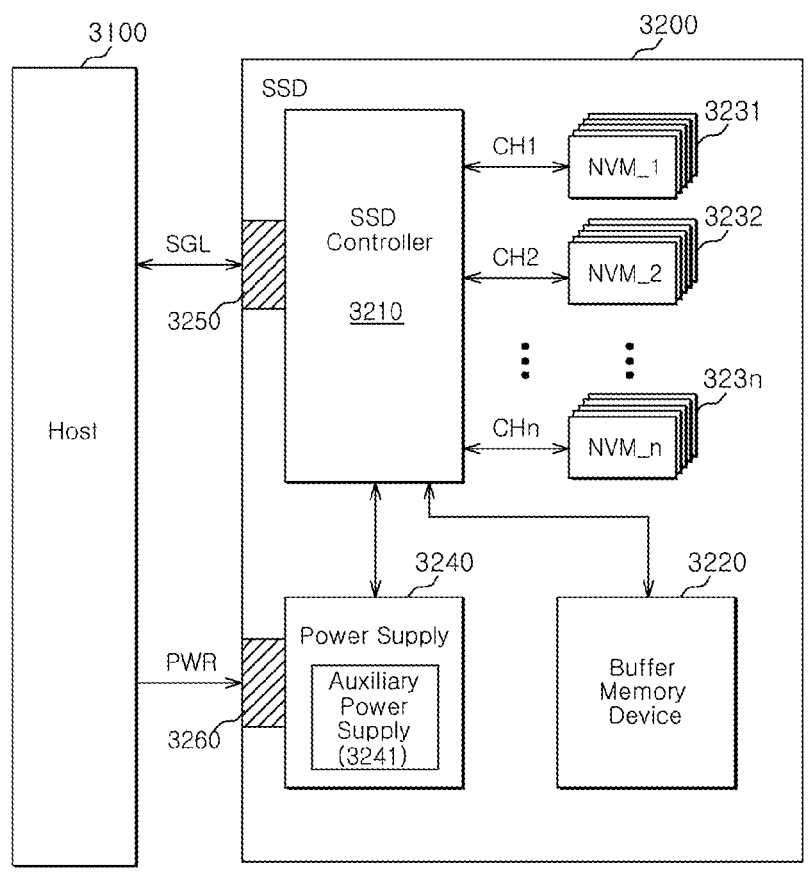
FIG. 15 is a block diagram illustrating an SSD according to an embodiment.

FIG. 15 is a block diagram illustrating an SSD including the nonvolatile memory device according to an embodiment. Referring to FIG. 15, a data processing system 3000 may include a host device 3100 and an SSD 3200.

The SSD 3200 may include an SSD controller 3210, a buffer memory device 3220, a plurality of nonvolatile memory devices 3231 to 323n, a power supply 3240, a signal connector 3250, and a power connector 3260.

The SSD 3200 may operate in response to a request of the host device 3100. That is, the SSD controller 3210 may be configured to access the nonvolatile memory devices 3231 to 323n in response to a request from the host 3100. For example, the SSD controller 3210 may be configured to control read, program, and erase operations of the nonvolatile memory devices 3231 to 323n. Furthermore, the SSD controller 3210 may perform the dynamic interleaving method according to the embodiments. Therefore, the data processing speed of the SSD 3200 may be enhanced.

The buffer memory device 3220 may be configured to temporarily store data which are to be stored in the nonvolatile memory devices 3231 to 323n. Furthermore, the buffer memory device 3220 may be configured to temporarily store data read from the nonvolatile memory devices 3231 to 323n. The data which are temporarily stored in the buffer memory device 3220 may be transmitted to the host device 3100 or the nonvolatile memory devices 3231 to 323n, according to the control of the SSD controller 3210.

The nonvolatile memory devices 3231 to 323n may be used as storage media of the SSD 3200. The respective nonvolatile memory devices 3231 to 323n may be connected to the SSD controller 3210 through a plurality of channels CH1 to CHn. One channel may be connected to one or more nonvolatile memory devices. The nonvolatile memory devices connected to one channel may be connected to the same signal bus and the same data bus.

The power supply 3240 may be configured to provide power PWR inputted through the power connector 3260 into the SSD 3200. The power supply 3240 may include an auxiliary power supply 3241. The auxiliary power supply 3241 may be configured to supply power to normally terminate the SSD 3200, when sudden power off occurs. The auxiliary power supply 3241 may include super capacitors capable of storing power PWR.

The SSD controller 3210 may be configured to exchange signals SGL with the host device 3100 through the signal connector 3250. Here, the signals SGL may include commands, addresses, data and the like. The signal connector 3250 may be configured as a connector such as PATA (Parallel Advanced Technology Attachment), SATA (Serial Advanced Technology Attachment), SCSI (Small Computer System Interface), or SAS (Serial SCSI), according to the interface method between the host device 3100 and the SSD 3200.

Figure 16:
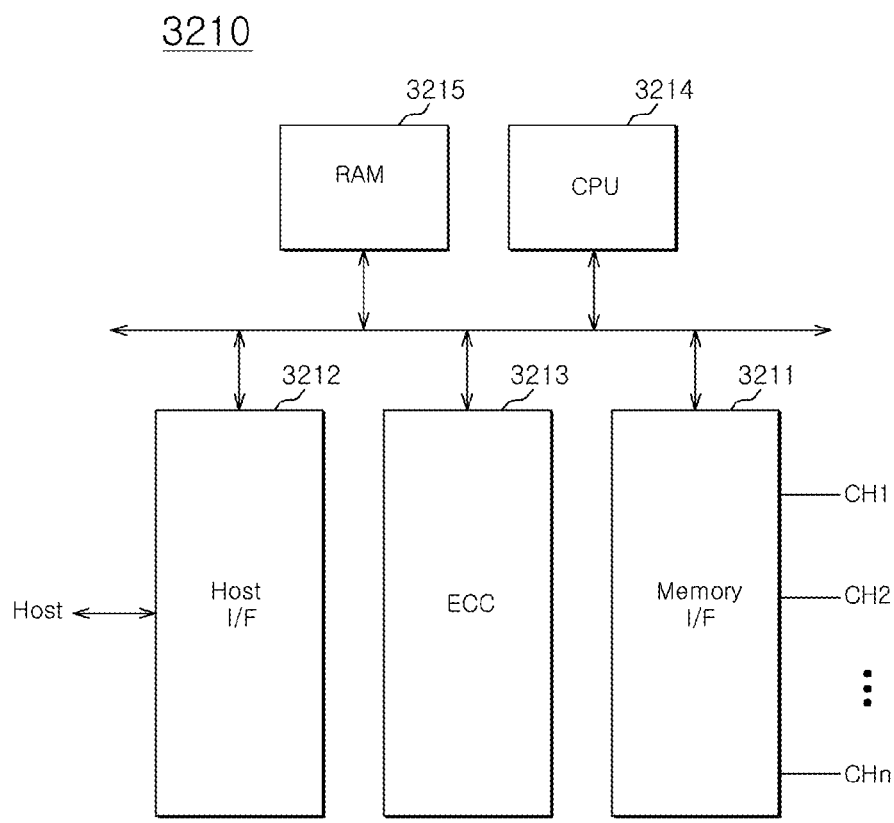
FIG. 16 is a block diagram illustrating an SSD controller illustrated in FIG. 15.

FIG. 16 is a block diagram illustrating the SSD controller illustrated in FIG. 15. Referring to FIG. 16, the SSD controller 3210 may include a memory interface 3211 (i.e., Memory I/F), a host interface 3212 (i.e., Host I/F), an ECC unit 3213, a CPU 3214, and a RAM 3215.

The memory interface 3211 may be configured to provide a command and an address to the nonvolatile memory devices 3231 to 323n (not illustrated in FIG. 16). Furthermore, the memory interface 3211 may be configured to exchange data with the nonvolatile memory devices 3231 to 323n. The memory interface 3211 may scatter data transferred from the buffer memory device 3220 over the respective channels CH1 to CHn, according to the control of the CPU 3214. Furthermore, the memory interface 3211 may transfer data read from the nonvolatile memory devices 3231 to 323n to the buffer memory device 3220, according to the control of the CPU 3214.

The host interface 3212 may be configured to provide an interface with the SSD 3200 in response to the protocol of the host device 3100. For example, the host interface 3212 may be configured to communicate with the host 3100 through one of PATA (Parallel Advanced Technology Attachment), SATA (Serial Advanced Technology Attachment), SCSI (Small Computer System Interface), and SAS (Serial SCSI) protocols. Furthermore, the host interface 3212 may perform a disk emulation function of supporting the host device 3100 to recognize the SSD 3200 as a hard disk drive (HDD).

The ECC unit 3213 may be configured to generate parity bits based on the data transmitted to the nonvolatile memory devices 3231 to 323n. The generated parity bits may be stored in spare areas of the nonvolatile memory devices 3231 to 323n. The ECC unit 3213 may be configured to detect an error of data read from the nonvolatile memory devices 3231 to 323n. When the detected error falls within a correction range, the ECC unit 3213 may correct the detected error.

The CPU 3214 may be configured to analyze and process a signal SGL inputted from the host device 3100. The CPU 3214 may control overall operations of the SSD controller 3210 in response to a request of the host device 3100. The CPU 3214 may control the operations of the buffer memory device 3220 and the nonvolatile memory devices 3231 to 323n according to firmware for driving the SSD 3200. The RAM 3215 may be used as a working memory device for driving the firmware.

Figure 17:
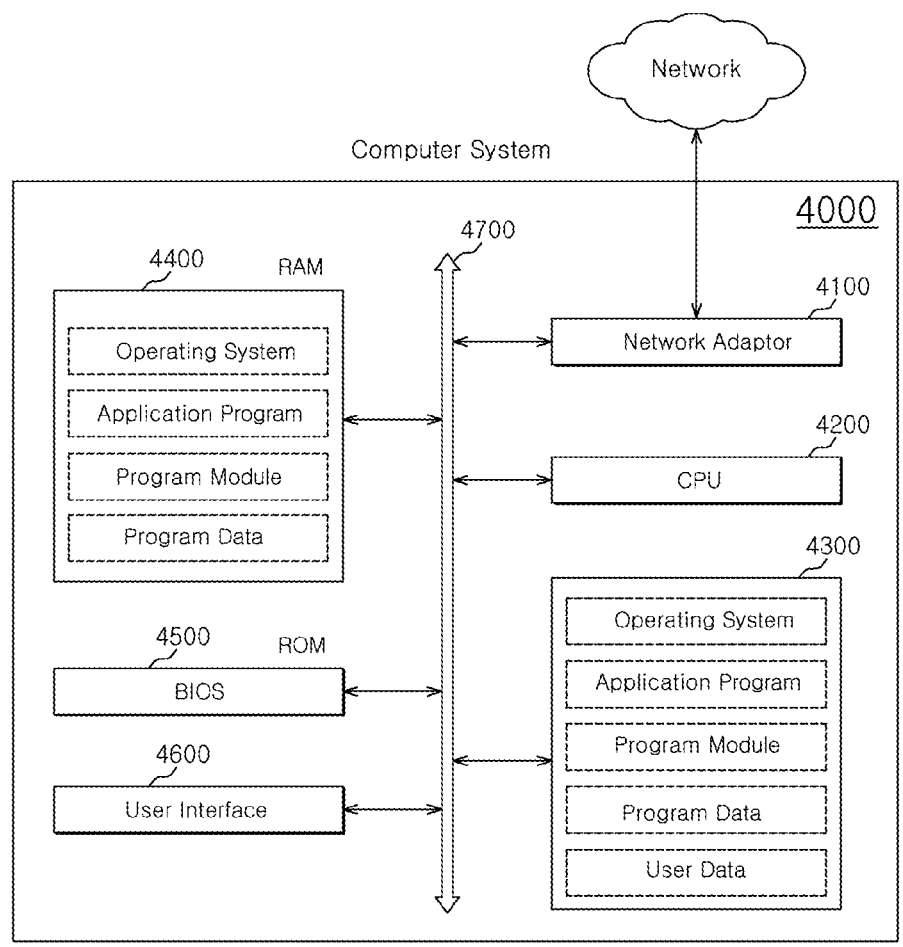
FIG. 17 is a block diagram illustrating a computer system in which the data storage device according to an embodiment is mounted.

FIG. 17 is a block diagram illustrating a computer system in which the data storage device according to an embodiment, may be mounted. Referring to FIG. 17, the computer system 4000 may include a network adapter 4100, a CPU 4200, a data storage device 4300, a RAM 4400, a ROM 4500, and a user interface 4600, which are electrically connected to the system bus 4700. Here, the data storage device 4300 may be configured as the data storage device 1200 illustrated in FIG. 12 or the SSD 3200 illustrated in FIG. 15.

The network adapter 4100 may be configured to interface the computer system 4000 and external networks. The CPU 4200 may be configured to perform overall arithmetic operations for driving an operating system or application programs staying in the RAM 4400.

The data storage device 4300 may be configured to store overall data required by the computer system 4000. For example, the operating system for driving the computer system 4000, application programs, various program modules, program data, and user data may be stored in the data storage device 4300.

The RAM 4400 may be used as a working memory device of the computer system 4000. During a booting operation, the operating system, application programs, various program modules, which are read from the data storage device 4300, and program data required for driving the programs may be loaded into the RAM 4400. The ROM 4500 may store a basic input/output system (BIOS) which may be enabled before the operating system is driven. Through the user interface 4600, information exchange may be performed between the computer system 4000 and a user.

Although not illustrated in the drawing, the computer system 400 may further include a battery, an application chipset, a camera image processor (CIS) and the like.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow when taken in conjunction with the above description and accompanying drawings.

What is claimed is:
1. A data storage device comprising:
a plurality of nonvolatile memory devices; and
a controller configured to control operations of the nonvolatile memory devices,
wherein the controller maps physical addresses of the nonvolatile memory devices into logical addresses provided from a host device, compares a size of data requested to be accessed to a size of programmable pages of the nonvolatile memory devices, creates a comparison result, changes a first physical address mapped into a logical address corresponding to the data requested to be accessed according to the comparison result, and performs an interleaving operation for the nonvolatile memory devices using the changed first physical address.

2. The data storage device according to claim 1, wherein the controller remaps a second physical address into a logical address requested to be accessed from the host device by reflecting environmental factors of the host device and the nonvolatile memory devices, and
  the environmental factors comprise operating states of the nonvolatile memory devices, a page size, and positions of programmable pages.

3. The data storage device according to claim 2, wherein the controller determines an operating state of a nonvolatile memory device to which the second physical address mapped into the logical address requested to be accessed is allocated, and changes the second physical address mapped into the logical address requested to be accessed according to a determination result.

4. The data storage device according to claim 3, wherein, when determining that the nonvolatile memory device to which the second physical address mapped into the logical address requested to be accessed is allocated is in a busy state, the controller remaps the logical address requested to be accessed into a third physical address allocated to a nonvolatile memory device in a ready state.

5. The data storage device according to claim 1, wherein, when determining that the size of the data requested to be accessed is larger than—the—size of the programmable pages of the nonvolatile memory devices, the controller remaps the logical address corresponding to the data requested to be accessed into physical addresses of multi-pages comprising two or more pages.

6. The data storage device according to claim 5, wherein the multi-pages are included in any one of the nonvolatile memory devices, and
  the controller controls the multi-pages according to a multi-plane method such that—the—two or more pages of the multi-pages are operated in parallel.

7. The data storage device according to claim 1, wherein the nonvolatile memory devices and the controller are configured as a memory card.

8. The data storage device according to claim 1, wherein the nonvolatile memory devices and the controller are configured as a solid state drive (SSD).

9. A data storage device comprising:
  a plurality of nonvolatile memory devices; and
  a controller configured to control operations of the nonvolatile memory devices,
  wherein the controller maps physical addresses of the nonvolatile memory devices into logical addresses provided from a host device, compares a size of data requested to be accessed currently to a size of data which is to be requested to be accessed in the future, creates a comparison result, changes a first physical address mapped into a logical address corresponding to the data requested to be accessed currently according to the comparison result, and performs an interleaving operation for the nonvolatile memory devices using the changed first physical address.

10. The data storage device according to claim 9, wherein the controller remaps a second physical address of the nonvolatile memory devices into a logical address requested to be accessed from the host device by reflecting environmental factors of the host device and the nonvolatile memory devices,
  wherein the environmental factors comprise operating states of the nonvolatile memory devices, a page size, and positions of programmable pages.

11. The data storage device according to claim 10, wherein the controller determines an operating state of a nonvolatile memory device to which the second physical address mapped into the logical address requested to be accessed is allocated, and changes the second physical address mapped into the logical address requested to be accessed according to a determination result.

12. The data storage device according to claim 11, wherein, when determining that the nonvolatile memory device to which the second physical address mapped into the logical address requested to be accessed is allocated is in a busy state, the controller remaps the logical address requested to be accessed into a third physical address allocated to a nonvolatile memory device in a ready state.

13. The data storage device according to claim 9, wherein, when determining that the size of data requested to be accessed currently is larger than a size of a programmable page and the size of data which is to be requested to be accessed in the future is equal to the size of the programmable page, the controller changes the first physical address.

14. The data storage device according to claim 13, wherein the controller remaps the logical address corresponding to the data requested to be accessed currently into physical addresses of multi-pages comprising two or more pages.

15. The data storage device according to claim 14, wherein the multi-pages are included in any one of the nonvolatile memory devices, wherein the controller controls the multi-pages according to a multi-plane method such that the two or more pages of the multi-pages are operated in parallel.

16. A data storage device comprising:
  a plurality of nonvolatile memory devices; and
  a controller configured to control operations of the nonvolatile memory devices,
  wherein the controller maps physical addresses of the nonvolatile memory devices into logical addresses provided from a host device, remaps a physical address into a logical address requested to be accessed from the host device based on positions of pages where data is programmed, and performs an interleaving operation for the nonvolatile memory devices using the remapped physical address.

17. The data storage device according to claim 16, wherein the controller determines to control a multi-plane operation.

18. The data storage device according to claim 17, wherein the controller refers to a size of data requested to be accessed when the controller determines whether to control the multi-plane operation.

19. The data storage device according to claim 16, wherein the controller determines to control the multi-plane operation according to a size of data to be requested to be accessed in the future.

20. The data storage device according to claim 16, wherein multi-pages comprising two or more pages are included in any one of the nonvolatile memory devices, and
  when the controller controls the multi-plane operation, the two or more pages of the multi-pages operate in parallel.

* * * * *